US007256526B1

(12) United States Patent
Perkins et al.

(10) Patent No.: US 7,256,526 B1
(45) Date of Patent: Aug. 14, 2007

(54) INTEGRATED STATOR-AXLE FOR IN-WHEEL MOTOR OF AN ELECTRIC VEHICLE

(76) Inventors: William P. Perkins, 1553 N. Denwood St., Dearborn, MI (US) 48128; Joseph Palazzolo, 3925 Forest Edge Dr., Commerce Township, MI (US) 48328; Mansour Peyghaleh, 22204 Stablehouse Dr., Sterling, VA (US) 20164; Mark A. Benson, 18260 Oak Lake Ct., Leesburg, VA (US) 20176

( * ) Notice: Subject to any disclaimer, the term of this patent is extended or adjusted under 35 U.S.C. 154(b) by 0 days.

(21) Appl. No.: 11/116,228

(22) Filed: Apr. 28, 2005

Related U.S. Application Data (62) Division of application No. 10/706,277, filed on Nov. 13, 2003.

(51) Int. Cl.
*H02K 1/18* (2006.01)
(52) U.S. Cl. .......................................... 310/218; 310/64
(58) Field of Classification Search ................ 310/218, 310/67 A, 67 R, 254, 52, 54, 64
See application file for complete search history.

(56) References Cited

U.S. PATENT DOCUMENTS

| 3,914,859 | A |   | 10/1975 | Pierson |
|---|---|---|---|---|
| 4,458,228 | A | * | 7/1984 | Baumgartner ................ 335/229 |
| 4,574,210 | A | * | 3/1986 | Wieland ........................ 310/59 |
| 5,019,733 | A |   | 5/1991 | Kano et al. |
| 5,164,623 | A |   | 11/1992 | Shkondin |
| 5,747,909 | A |   | 5/1998 | Syverson et al. |
| 6,087,744 | A |   | 7/2000 | Glauning |
| 6,278,216 | B1 |   | 8/2001 | Li |
| 6,492,756 | B1 |   | 12/2002 | Maslov et al. |
| 6,580,188 | B2 |   | 6/2003 | Katagiri et al. |
| 6,617,746 | B1 |   | 9/2003 | Maslov et al. |
| 6,664,692 | B1 |   | 12/2003 | Kristoffersen |
| 6,720,688 | B1 |   | 4/2004 | Schiller |

FOREIGN PATENT DOCUMENTS

DE    196 14 862 A1   11/1997

(Continued)

*Primary Examiner*—Darren Schuberg
*Assistant Examiner*—Nguyen Hanh
(74) *Attorney, Agent, or Firm*—Proskauer Rose LLP (57) ABSTRACT

One or more wheels of an electrically powered vehicle contains a motor rotor and a motor stator that is mounted on an integrated structure having a motor stator mounting element portion and wheel axle portion on each side thereof. The structure is fabricated from a unitary non-ferromagnetic substance. A rotor housing is journalled to the axle portion on both sides of the motor stator mounting element via bearings. A wheel assembly is mounted on the rotor housing thereby to be driven by the rotor. Forced-air cooling is provided through a hollow central passage. A plug separates the passage into two distinct sections, the inlet and the outlet. A plurality of cavities, provided with heat exchanger surfaces, are contained within the stator mounting element portion. Channels at each end of each cavity extend in the radial direction into the central passage. Cooling air enters from one end of the central passage, is directed through the inlet channels, the cavities and outlet channels before exiting through the opposite end of the central passage. Additional channels provide wire access to the motor stator.

34 Claims, 7 Drawing Sheets

FOREIGN PATENT DOCUMENTS

| | | |
|---|---|---|
| DE | 196 36 591 A1 | 3/1998 |
| EP | 0 463 168 A1 | 1/1992 |
| EP | 0 942 517 A2 | 9/1999 |
| EP | 1 130 748 A1 | 9/2001 |
| WO | WO 03/085807 A1 | 10/2003 |

* cited by examiner

PRIOR ART

INTEGRATED STATOR-AXLE FOR IN-WHEEL MOTOR OF AN ELECTRIC VEHICLE

RELATED APPLICATION

This application is a divisional of U.S. application Ser. No. 10/706,277 filed on Nov. 13, 2003.

FIELD OF THE INVENTION

The present invention relates to electrically powered vehicles, more particularly to a vehicle wheel including a drive motor and an integrated motor mounting and wheel axle structure.

BACKGROUND

Development of efficient and versatile direct current motor drives has provided advantageous implementation in battery powered electric vehicles. A vehicle drive motor, with or without control circuitry therefor, can be incorporated in one or more wheels of a vehicle for direct provision of wheel traction. Such arrangements are exemplified in U.S. Pat. No. 6,617,746 to Maslov et al. and U.S. Pat. No. 6,492,756 to Maslov et al., both patents commonly assigned with the present invention and incorporated herein in their entirety.

Figure 1:
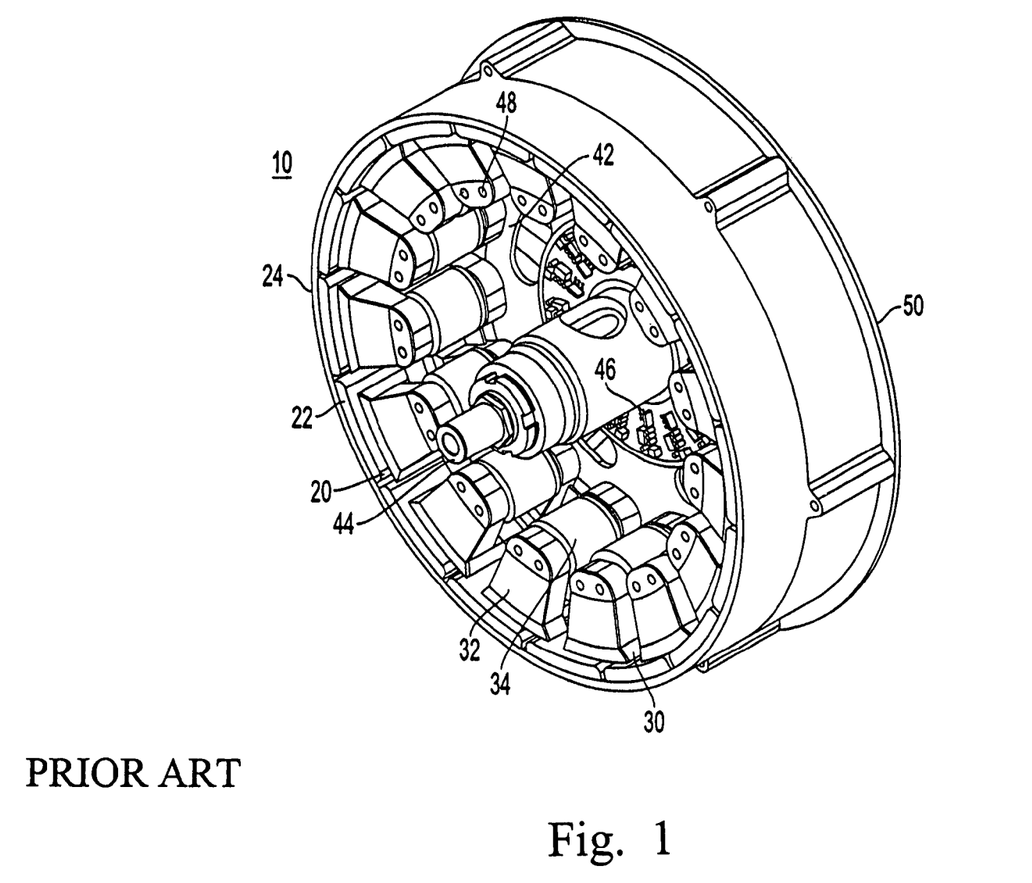
FIG. 1 is a partial three dimensional perspective diagram of a prior art motor.

FIG. 1 is a partial three dimensional perspective diagram of the structure of the central portion of a vehicle wheel in which a motor is contained, similar to the structure disclosed in the '746 patent identified above. Motor 10 comprises annular permanent magnet rotor 20 and annular stator structure 30 separated by a radial air gap. The stator comprises a plurality of ferromagnetically isolated elements. Core segments 32, made of magnetically permeable material and isolated from direct contact with each other, have respective windings 34 formed thereon. The rotor comprises a plurality of permanent magnets 22, circumferentially distributed about the air gap and affixed to an annular back plate 24, which may be of a magnetically permeable material. Each core segment is a unitary magnetic structure that comprises two poles joined in the axial direction by a linking portion, about which stator coils 34 are wound. The '756 patent illustrates stator core segments in which the poles of each pole pair are aligned in a direction perpendicular to the axis.

Within the cylindrical annular rotor structure, the stator core segments are rigidly secured by two plates 42, only one of which is illustrated in the drawing. Each plate is of a rigid circular configuration having an outer diameter and a circular cutout portion at its center that forms an inner diameter. The inner diameter is sized to fit a stationary shaft 44 and to be affixed to a member 46 integral with the shaft. Along the plate periphery, the plate is provided with holes, not shown, appropriately spaced to mate with corresponding through holes 48 in the stator core segments. Each of the plates is secured to the shaft and spaced from each other appropriately to be secured to, and to sandwich, the stator core segments at each axial side thereof via the mating holes. Suitable plate structure is illustrated in more detail in the '756 patent. Thus an annular ring is formed of stator core segments that are coextensively aligned in the axial direction across the air gap from the rotor. The stationary shaft, plates and stator structure, are contained within a housing 50, to which the annular rotor backplane and permanent magnets are attached. The housing is journalled to the shaft on the outside of the plates through appropriate bushings and bearings.

"In-wheel" motor construction raises several challenges. Considerable manufacturing complexity is involved in providing the proper structural support for maintaining the motor stator and the stationary shaft separated and positioned in relation to the wheel axle. As stator and wheel axle are produced from separate pieces, they must be manufactured with very high precision and mated together very precisely to minimize misalignments. These separate parts are often made from different materials which, due to different rates of thermal expansion, creates additional stresses during temperature cycling. The use of dissimilar metals also promotes galvanic action and accelerates corrosion. Each of these detractors increases the probability of premature motor and system failure. Provision of electrical connections to the stator elements and channeling of fluid to the stator for thermal management present additional challenges. Sleeves may be required to protect wires from sharp corners and seals may be required to contain fluid used to cool the motor.

Needs thus exist for an integrated wheel and axle structure that accommodates electrical wire access to the stator and coolant flow to the stator, that reduces stresses between the stator and the axle during thermal cycling and mechanical and electrical loading, and that provides easier service disassembly/assembly.

DISCLOSURE OF THE INVENTION

The present invention fulfills the above described needs, at least in part, by provision of an electrically powered vehicle having one or more wheels containing a motor rotor and a motor stator that is mounted on an integrated structure having a wheel axle portion and a motor stator mounting element portion. The structure is fabricated from a unitary non-ferromagnetic substance. The stator mounting element portion has a cylindrical configuration with its axis collinear with the axis of the axle. At least one ferromagnetic segment of the motor stator is joined directly to the stator mounting element portion. Preferably, the motor stator comprises a plurality of ferromagnetic core segments ferromagnetically isolated from each other and mounted on the stator mounting element portion of the integrated structure. Such isolation enhances flux concentration to maximize interaction with rotor elements.

The axle portion is a round shaft having a length greater than its diameter; the diameter of the cylindrical stator mounting element is greater than its length in the direction of the axis. The wheel axle portion extends on each axial side of the motor stator mounting element. Both axle sections are collectively termed an axle portion in the following description. The rotor has an annular ring configuration that surrounds the stator about a radial air gap. A rotor housing is journalled to the axle portion on both sides of the motor stator mounting element via bearings. A wheel assembly is mounted on the rotor housing thereby to be driven by the rotor.

A hollow central passage, extends along the axis of the axle portion and the stator mounting element portion. A plug in the passage prevents flow of air in a direct path along the entire passage. A plurality of cavities, provided with heat exchanger fins or other cooling surfaces, are contained within the stator mounting element portion. Each cavity forms an arc at a fixed radial distance from the axis and extends in a direction parallel to the axis from a first end to a second end. Channels at each end of each cavity extend in the radial direction from the respective cavity to an opening in the central passage. The plug in the central passage is located at a position intermediate the locations along the axis of the first and second ends of the cavities. Thus, incoming air from one end of the central passage is directed through the inlet channels to the first ends of the cavities, through the cavities and heat exchanger surfaces to the second ends of the cavities, through the outlet channels at the second ends and into the central passage near the exit. The wheel axle portion additionally contains one or more channels for providing wire access to the motor stator.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which:

FIG. 7b is a sectional view of the stator element shown in FIG. 3a.

DETAILED DESCRIPTION OF THE INVENTION

Figure 2:
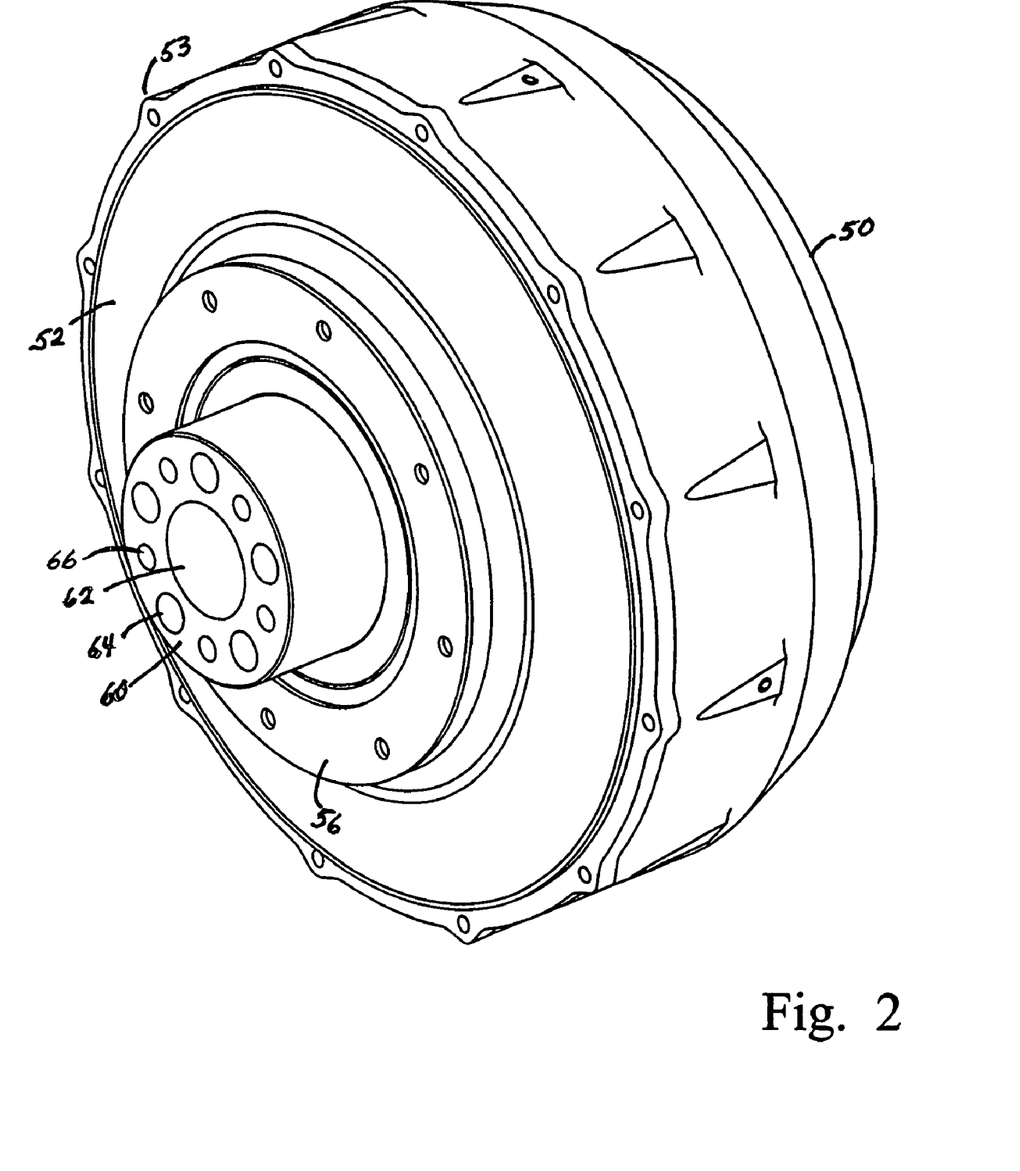
FIG. 2 is a perspective view of a vehicle wheel of the present invention.

In the present invention, stator elements are directly mounted on an integrated structure that includes an axle portion and a stator element mounting portion. The rotor radially surrounds the stator and is separated therefrom by a radial air gap. FIG. 2 is a perspective view that illustrates a rotor housing 50 to which is attached rotor cover 52 at protrusions 53. A vehicle wheel can be mounted on and secured to the rotor housing. The rotor is journalled to the axle portion 60, which is an inner section of the integrated structure, through bearings that are retained within inner bearing retainer ring 56. As will be evident from other drawing figures, which are discussed below, the integrated structure includes an axle portion formed on each axial side of a stator mounting portion. Axle portion section 60 contains a hollow central passage 62, cable channels 64 and mounting holes 66, all of which are oriented generally parallel to the axis. Only central passage 62 extends through the entire integrated structure. Cable channels 64 provide access to stator elements for power supply and motor control units. Mounting holes 66 provide for attachment of the wheel to the vehicle frame. While five cable channels and five mounting holes are shown, it is to be understood that the number shown is for illustrative purposes and may be adjusted to suit particular needs. For example, the number of cable channels may be determined in relation to the number of stator elements and the need for access.

Figure 3:
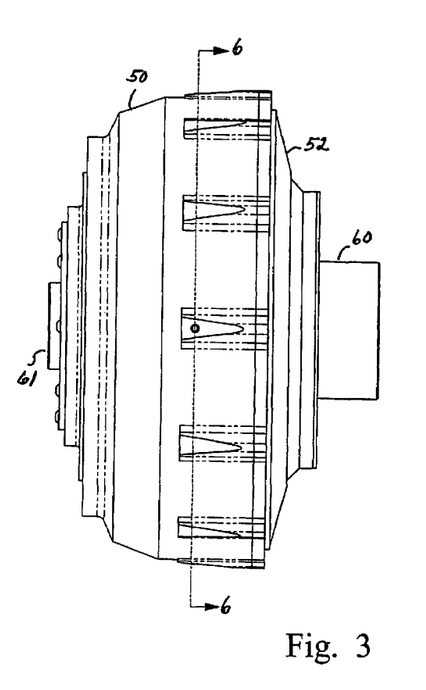
FIG. 3 is a side view of the vehicle wheel shown in FIG. 2.
Figure 4:
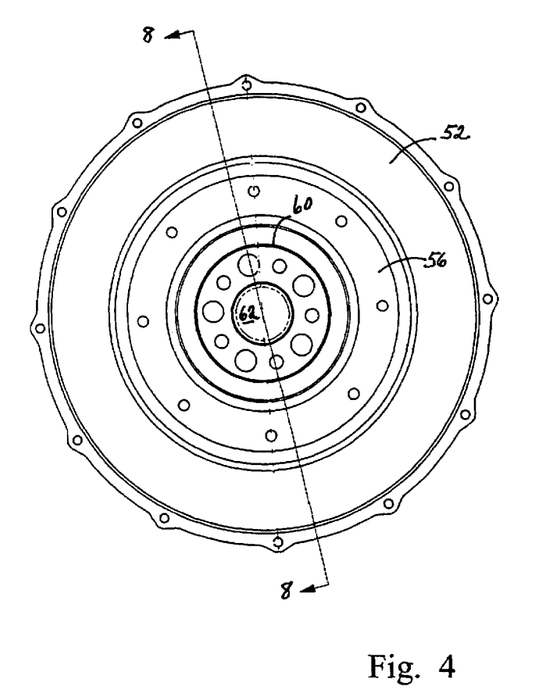
FIG. 4 is an inner view of the wheel of FIG. 2.
Figure 5:
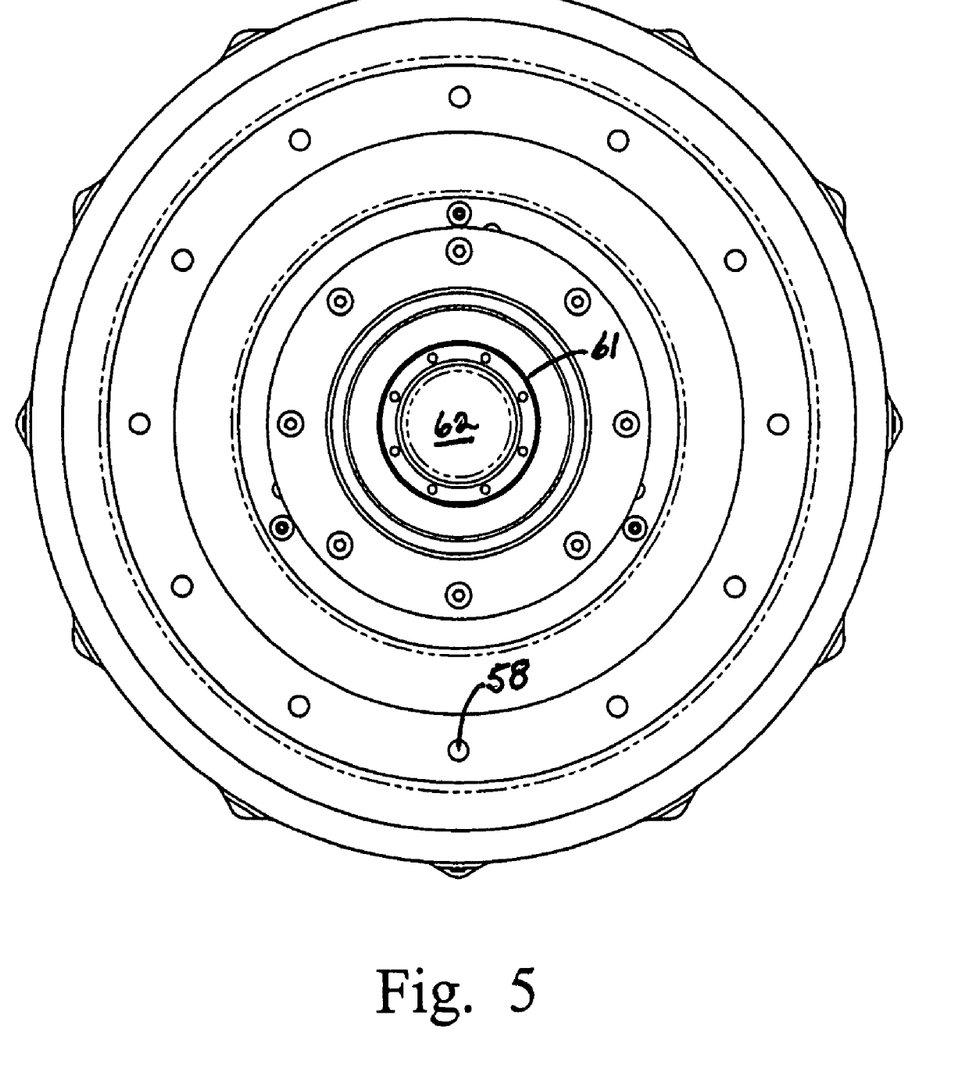
FIG. 5 is an outer view of the wheel of FIG. 2.

FIG. 3 is a side view of the vehicle wheel, the inner side of the wheel facing to the right. FIG. 4 is a view of the inner side of the wheel. The inner side is seen in the perspective view of FIG. 2. FIG. 5 is view of the outer side of the wheel. The axle section 61 on the outer side of the wheel is of a smaller diameter than the diameter of axle section 60. Bearings on the outer axle section are retained by bearing retainer ring 57. Holes 58 in the rotor housing provide means for mounting a tire assembly to the wheel.

Figure 6:
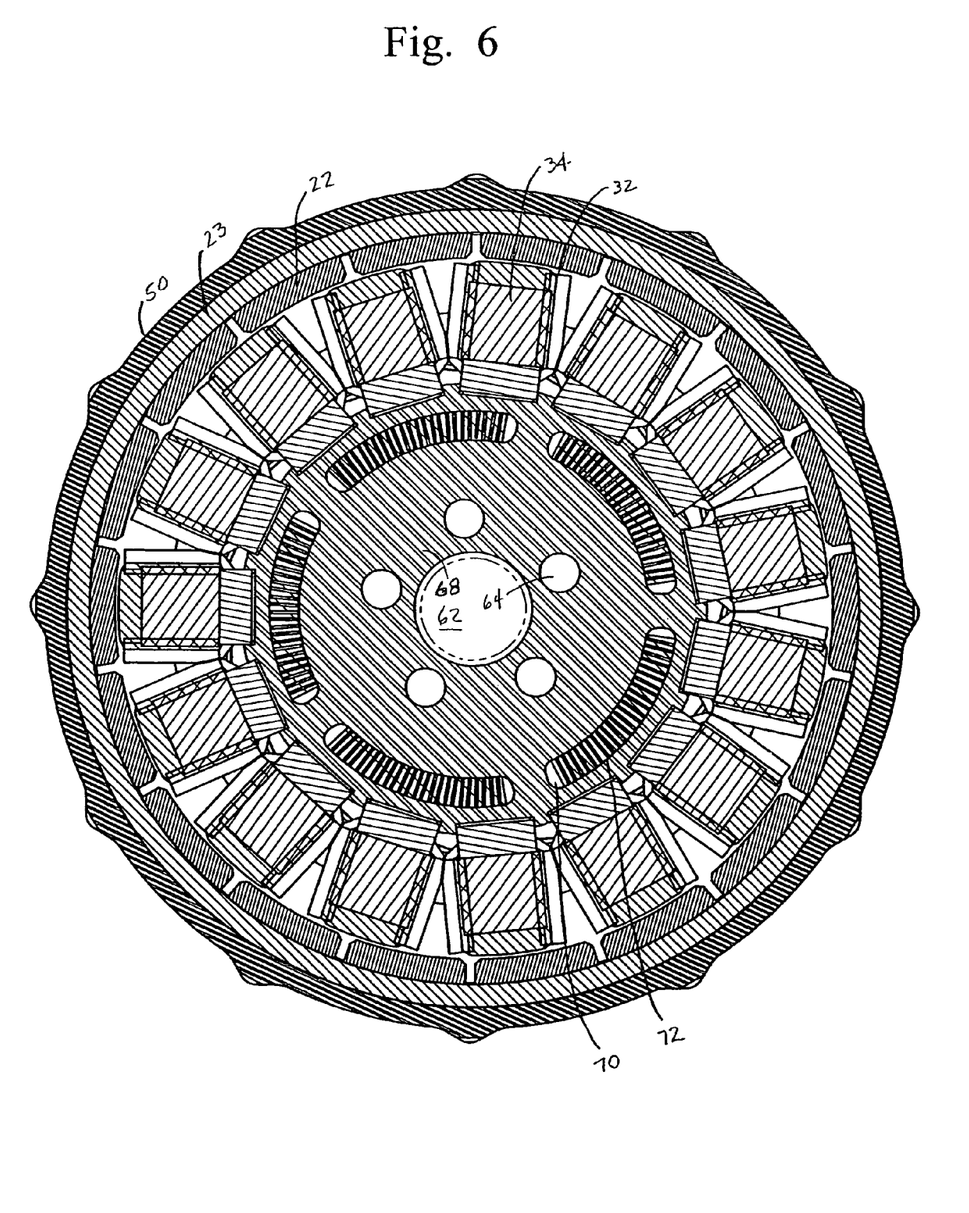
FIG. 6 is a sectional view of the wheel shown in FIG. 2, taken at cross-section 6-6 of FIG. 3.

FIG. 6 is a sectional view of the wheel taken at cross-section 6-6 of FIG. 3, which is a plane perpendicular to the wheel axis. Permanent magnets 22 are distributed along back iron 23, which is attached to the rotor housing 50. The magnets alternate in magnetic polarity along a radial air gap across from stator segments 32. The stator segments comprise ferromagnetic cores upon which are formed windings 34 that are suitably encapsulated with potting material.

Figure 7A:
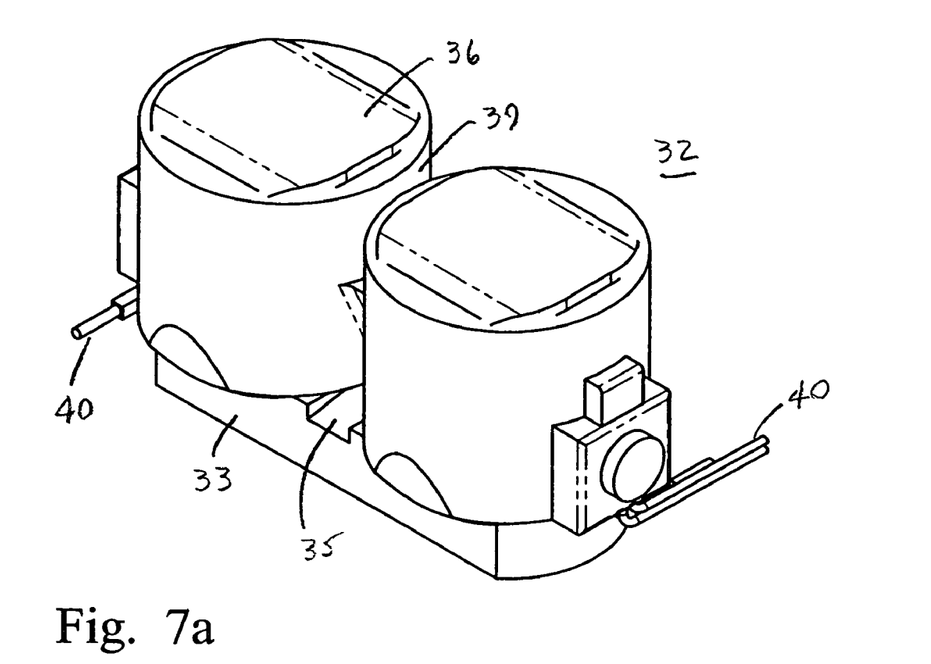
FIG. 7a is a perspective view of a stator element of the present invention.
Figure 7B:
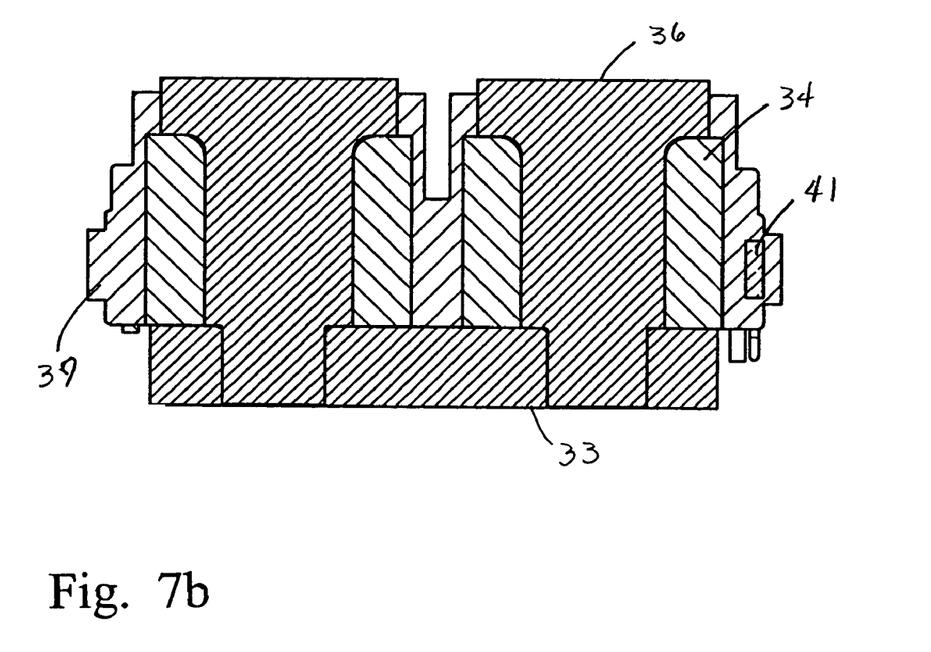

FIGS. 7a and 7b, respectively, illustrate a perspective view and a cross-sectional view of a stator element 32. The ferromagnetic core includes a base section 33 that links two pole sections 36. Sections 33 and 36 may be fabricated from a single component or a plurality of components of ferromagnetic material. Indentations 35 in the core base section 33 permit attachment to the integrated support structure via a clamp or equivalent means. Windings 34 are formed on the stator poles and encapsulated, for example, with epoxy potting material 39. Leads 40 from the windings extend from the potting material for connection to a power source and controller external to the wheel. A thermistor 41 may be provided as a temperature sensor.

As shown in FIG. 6, the stator segments are mounted to the stator mounting portion 68 of the integrated supporting structure, which is fabricated from a non-ferromagnetic material such as aluminum. Thus, the stator cores are individually isolated from ferromagnetic contact with each other. Although fifteen stator segments and eighteen rotor permanent magnets are shown in the illustrated embodiment, it should be appreciated that various other numerical combinations of rotor magnets and stator segments are within the purview of the invention.

The central passage 62 and the cable access channels 64 extend from the inner axle portion 60 into the stator mounting portion 68, as is more evident from FIG. 8, described below. Also formed within the stator mounting portion are cavities 70 having heat exchanger surfaces 72. Five such cavities are illustrated, each cavity having an arc shaped cross-sectional configuration at a fixed radial distance from the axis. The cavities are evenly distributed to provide cooling of the stator mounting portion and thus the stator segments mounted thereon. The number of cavities and angular extent thereof may be varied, depending on structural and air flow considerations. Cavities 70 are in communication with central passage 62 in a manner described with respect to FIG. 8.

Figure 8:
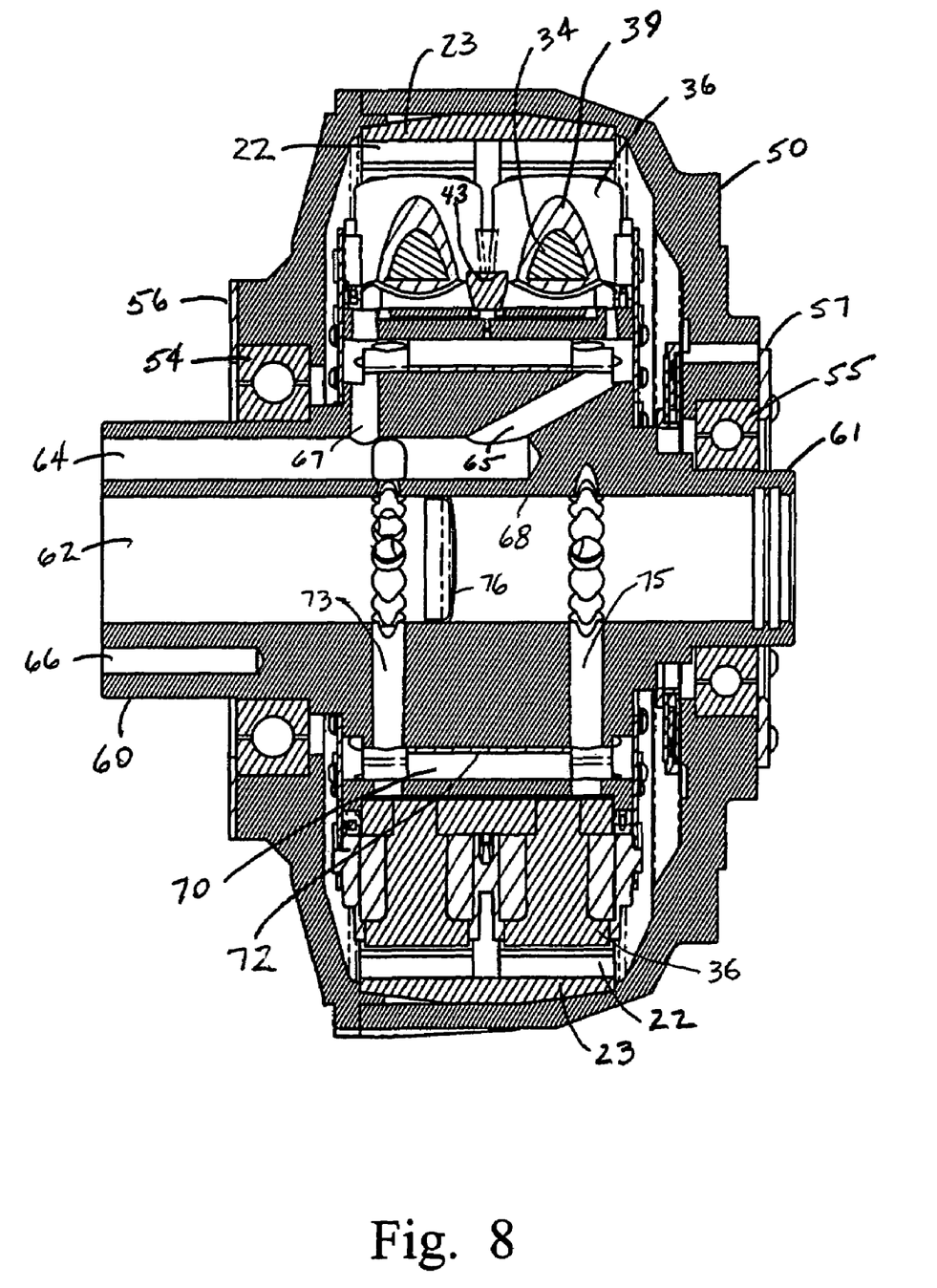
FIG. 8 is a sectional view of the wheel taken at cross-section 8-8 of FIG. 4.

FIG. 8 is a sectional view of the wheel taken at cross-section 8-8 of FIG. 4. The cross-section, which is parallel to the wheel axis is in a plane that cuts through the stator segment shown in the lower portion of the figure at an angle parallel to the alignment of the stator pole pair. The pole pair shown in the upper portion of the figure, as can be appreciated from the section shown in FIG. 6, is angularly displaced from the stator segment of the lower portion of the figure. The cross-sectional plane of FIG. 8 thus cuts through the upper stator segment at an angle with respect to its pole pair alignment. Each stator segment may be attached to the stator support structure 68 by means of clamp 43 that can be appropriately threaded to mate with the support structure.

The integrated support structure can be seen from FIG. 8 to form the stator element support portion 68 joined to the inner axle portion section 60 and outer axle portion section 61, as the outer section does not encompass cable channels and mounting holes. The diameter of the inner axle section 60 is smaller than its length in the axial direction. The diameter of stator element support section 68 is greater than its length in the axial direction. As the diameter of axle support section 61 is less than the diameter of axle support section 60, bearings 54 and 55 are at different radial distances, respectively, from the axis. Access to the stator segment wiring leads is provided through cable access channel 64 and openings 65 and 67. As there are no sharp corners or impediments to the placement of cable leads, it is not necessary to provide for protective sleeves.

Hollow central passage 62 contains channels 73 and 75 that are circumferentially distributed about the passage. As illustrated, inlet channels 73 are vertically aligned with the left end of cavity 70 and outlet channels 75 are vertically aligned with the right end of cavity 70. Both channels 73 and 75 extend radially from the central passage 62 to ends of the cavity 70. Central passage 62 permits entry of coolant air supplied to the inner axle portion 60. Plug 76 is situated in central passage 62 at a location along the axis that is between the channels 73 and 75. The plug is a barrier that prevents a direct flow of the coolant air along the central passage 62 from the inlet at axle portion 60 to the outlet at the outer axle portion 61.

In the illustrated embodiment, it is preferred that three coolant inlet channels 73 and three corresponding outlet channels 75 be provided for each cavity 70 to permit a relatively even distribution of coolant air through the heat exchanger surfaces in the cavity. As five cavities 70 are provided in this embodiment, fifteen inlet channels 73 and fifteen outlet channels 75 are formed in the stator support portion 68. Coolant air flow paths are thus traversed from the inlet of passage 62 through the fifteen inlet channels 73, through the five cavities 70, through the fifteen outlet channels 75, and exits outwards through the central passage 62. The effective areas of the central passage 62, inlet channels 73, cavities 70 and outlet channels 75 are closely matched to minimize pressure drops in the cooling system.

In this disclosure there is shown and described only preferred embodiments of the invention and but a few examples of its versatility. It is to be understood that the invention is capable of use in various other combinations and environments and is capable of changes or modifications within the scope of the inventive concept as expressed herein. For example, it is within the contemplation of the invention that a different number of stator elements and rotor magnets may be utilized, which may indicate a change in the number of cooling cavities, cooling channels, passage holes and/or cable channels. The invention is also applicable to motors in which the stator core is a single ferromagnetic piece mounted on the integrated support structure. The concepts of the invention are not limited to permanent magnet motors, and are also applicable, for example, to reluctance motors.

What is claimed is:

1. An electric motor apparatus comprising:
   a hollow shaft having a shaft wall defining a first central passage extending from one end of the hollow shaft to a central wall and a separate second central passage extending from the other end of the hollow shaft to the central wall, the shaft wall of the first central passage defining a first port and the shaft wall of the second central passage defining a second port, the first central passage in communication with the second central passage through the first and second ports;
   a stator support structure secured to said hollow shaft;
   a stator structure secured to said support structure;
   a rotor rotationally supported by said hollow shaft, said rotor comprising a plurality of permanent magnets; and
   wherein said rotor and said stator are separated by an air gap.

2. An electric motor apparatus as recited in claim 1, wherein the hollow shaft comprises at least one cavity that extends in a radial direction from the first central passage to the stator support structure.

3. An electric motor apparatus comprising:
   a hollow shaft having a central passage extending from one end of the hollow shaft to the other end of the hollow shaft, wherein said hollow shaft comprises at least one cavity that extends in a radial direction from the central passage to said stator support structure;
   a stator support structure secured to said hollow shaft, wherein an interior portion of the stator support structure includes a cavity extending between two locations in the axial direction, the cavity further extending radially from said two locations to the central passage of the hollow shaft;
   a stator structure secured to said stator support structure;
   a rotor rotationally supported by said hollow shaft, said rotor comprising a plurality of permanent magnets; and
   wherein said rotor and said stator are separated by an air gap.

4. An electric motor apparatus as recited in claim 3, wherein said stator support structure is formed from a unitary material.

5. An electric motor apparatus as recited in claim 3, wherein said stator support structure is non-ferromagnetic.

6. An electric motor apparatus as recited in claim 3, wherein said stator support structure has a cylindrical shape about an axis.

7. An electric motor apparatus as recited in claim 3, wherein said stator support structure axis is collinear with the axis of said hollow shaft.

8. An electric motor apparatus as recited in claim 3, wherein said stator support structure has a perimeter diameter that is greater than its length in the direction of the axis.

9. An electric motor apparatus as recited in claim 3, wherein said hollow shaft has an outside diameter at said one end that is greater than the outside diameter at said other end.

10. An electric motor apparatus as recited in claim 3, wherein said cavity extends in a direction parallel to the axis at a fixed radial distance from the hollow shaft.

11. An electric motor apparatus as recited in claim 3, further comprising a heat exchanger that is in thermal communication with said cavity.

12. An electric motor apparatus as recited in claim 3, wherein the cavity is in thermal communication with the air gap.

13. An electric motor apparatus as recited in claim 3, wherein said hollow shaft comprises a plug positioned in the axial direction between said two locations, wherein coolant is directed through the cavity from a first axial side of the plug to a second axial side of the plug.

14. An electric motor apparatus as recited in claim 13 wherein said plug directs at least some portion of coolant through said cavity from a first side of said plug to a second side of said plug.

15. An electric motor apparatus as recited in claim 13, wherein the hollow shaft and stator support structure are configured to direct coolant incoming to the central passage through said cavity and past said heat exchanger and out to the central passage.

16. An electric motor apparatus as recited in claim 3, the hollow shaft comprises a plurality of openings for securing the hollow shaft to a frame.

17. An electric motor apparatus as recited in claim 3, wherein said hollow shaft is secured to a machine.

18. An electric motor apparatus as recited in claim 17, wherein said machine is a vehicle.

19. An electric motor apparatus as recited in claim 3, wherein a wheel is secured to the rotor.

20. An electric motor apparatus as recited in claim 3, further comprising a bearing arrangement coupling the rotor to the hollow shaft axially adjacent each side of the stator.

21. An electric motor apparatus as recited in claim 3, wherein the rotor is configured in the shape of annular ring.

22. An electric motor apparatus as recited in claim 3, further comprising coolant means for directing coolant through the central passage of the hollow shaft during motor operation.

23. An electric motor apparatus as recited in claim 3, wherein the stator comprises a plurality of elements ferromagnetically isolated from each other.

24. An electric motor apparatus as recited in claim 3, further comprising means to supply power to the stator.

25. An electric motor apparatus as recited in claim 3, further comprising a control unit connected to the stator.

26. An electric motor apparatus as recited in claim 3 wherein said rotor further comprises a back iron.

27. An electric motor apparatus as recited in claim 3 wherein said one or more cavities are formed along an arc at a fixed radial distance from the hollow shaft in a direction parallel to the axis.

28. An electric motor apparatus as recited in claim 3 wherein said cavity is in thermal communication with said air gap that separates said rotor from said stator.

29. An electric motor apparatus as recited in claim 3 wherein said cable apertures extend through said stator support structure to allow at least one cable to extend from said stator to a position external to said hollow shaft.

30. An electric motor apparatus comprising:
  a hollow shaft having a central passage extending from one end of the hollow shaft to the other end of the hollow shaft; wherein said hollow shaft comprises at least one cavity that extends in a radial direction from the central passage to said stator support structure;
  at least one heat exchanger in thermal communication with the at least one cavity;
  a stator support structure secured to said hollow shaft, wherein an interior portion of the stator support structure comprises a cavity extending between two locations in the axial direction, the cavity further extending radially from said two locations to the central passage of the hollow shaft;
  a stator structure secured to said stator support structure;
  a rotor rotationally supported by said hollow shaft, said rotor comprising a plurality of permanent magnets; and
  wherein said rotor and said stator are separated by air gap.

31. An electric motor apparatus as recited in claim 30, wherein said cavity is in thermal communication with said air gap.

32. An electric motor apparatus as recited in claim 31, wherein said hollow shaft comprises a plurality of cable apertures.

33. An electric motor apparatus as recited in claim 31, wherein said stator support structure comprises apertures aligned with the cable apertures of the hollow shaft, whereby at least one cable can extend from the stator to a position external to the hollow shaft.

34. An electric motor apparatus as recited in claim 30, wherein the hollow shaft and stator support structure are configured to direct coolant incoming to the central passage through said cavity and past said heat exchanger and out to the central passage.

* * * * *